July 31, 1962 R. D. BECK ETAL 3,047,451
DIELECTRIC EMBOSSING PROCESS AND APPARATUS
Filed Dec. 28, 1959 2 Sheets-Sheet 1

INVENTORS
Ronald D. Beck &
BY Bruce E. Kevelin
Paul J. Reising
ATTORNEY

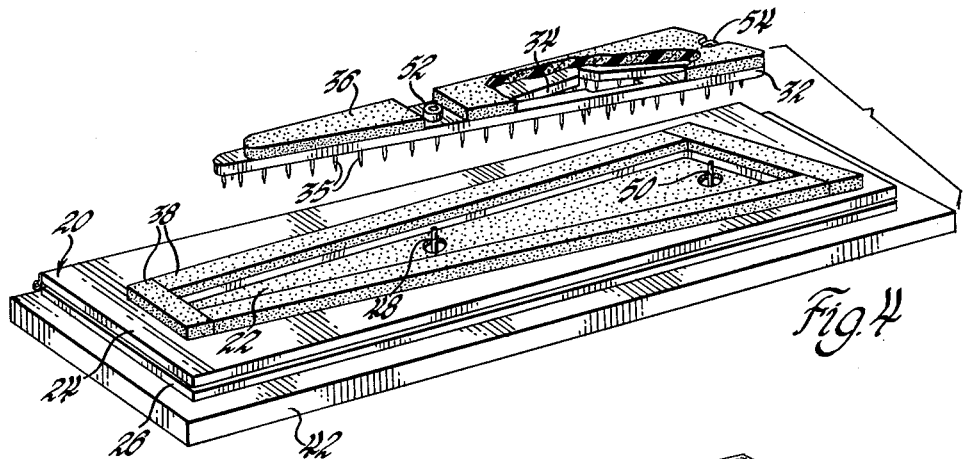
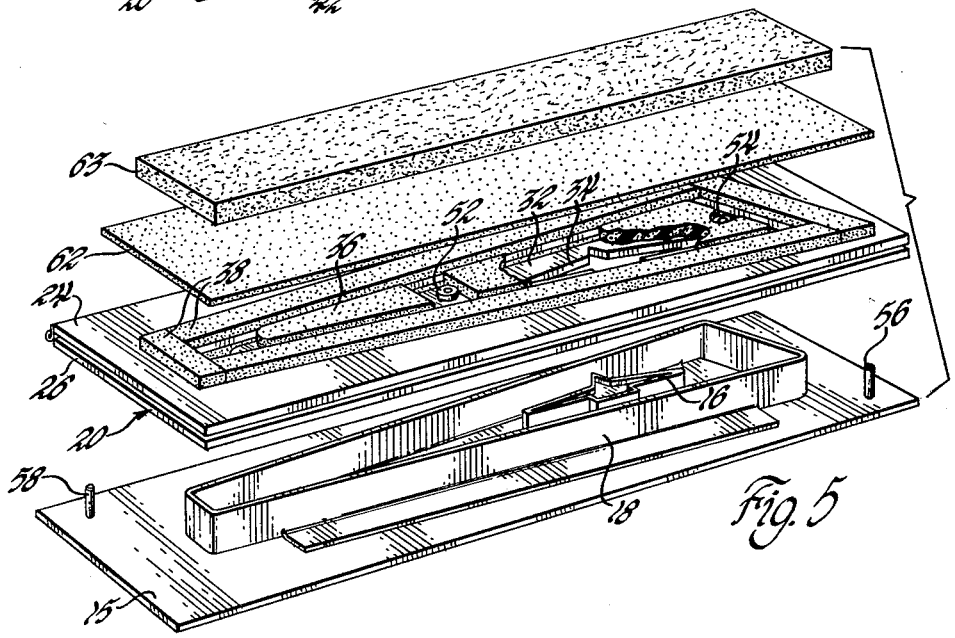
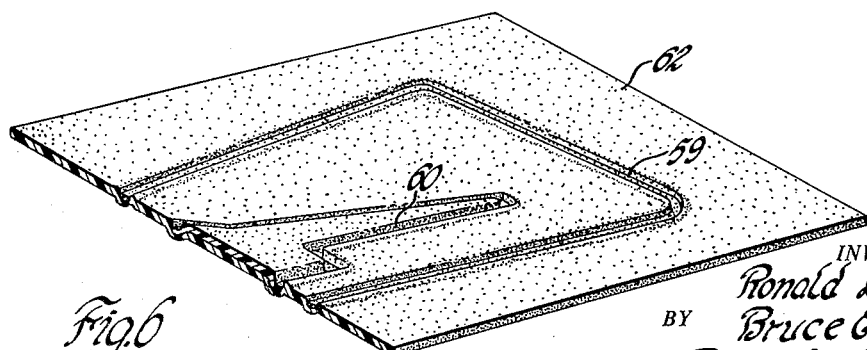

United States Patent Office 3,047,451
Patented July 31, 1962

3,047,451
DIELECTRIC EMBOSSING PROCESS AND APPARATUS
Ronald D. Beck, Clawson, and Bruce E. Kevelin, Detroit, Mich., assignors to General Motors Corporation, Detroit, Mich., a corporation of Delaware
Filed Dec. 28, 1959, Ser. No. 862,252
9 Claims. (Cl. 156—219)

This invention relates to a method and appartus for embossing decorative thermoplastic interior trim for automobiles and other such thermoplastic articles by means of dielectric heating.

Dielectric heating is a process wherein a dielectric material is subjected to an alternating current of radio frequency to cause a resonance of the molecules and thereby generate heat within the material. In practice this is accomplished by placing the material between metal electrodes connected to a source of high frequency alternating current. To effect an embossment in a thermoplastic sheet material such as polyvinyl chloride or the like for use as interior trim in automobiles, the face of one of the electrodes can be shaped to the desired pattern with raised portions in the form of blades and the thermoplastic material pressed against such electrode simultaneously with the application of the alternating current. In United States patent application Serial No. 648,654, filed March 26, 1957 now Patent No. 2,991,216 in the names of Ming C. Hsu and Ralph M. Stallard, there is disclosed and claimed a method and apparatus for cutting a smooth-edged finite portion from a flexible sheet of thermoplastic material by means of dielectric heating and in the same operation bonding this finite portion onto the surface of a backing sheet to thereby form a decorative embossed article. The present invention constitutes an improvement in the process and apparatus of the aforesaid patent application which enables the manufacture of articles with a plurality of decorative embossments, in the same color or in different colors, in a single embossing operation.

It is an object of the present invention to provide a method and apparatus useful for the manufacture of decorative articles having a plurality of embossed patterns.

Another object of the invention is the provision of a method and apparatus for removing a plurality of smooth-edged finite portions from a sheet of thermoplastic material by dielectric heating, and for embossing these finite portions onto the surface of a base sheet.

These and other objects will be readily apparent from the following detailed description of the invention made with reference to the appended drawings in which:

FIGURE 4 is an exploded view in partial section of the holder for the thermoplastic sheet together with the jig for arranging the holder;

FIGURE 5 is an exploded view of one of the press electrodes together with the holder and the thermoplastic materials; and FIGURE 6 is a perspective view of a portion of an article made in accordance with the process and apparatus shown in FIGURES 1 through 5.

Figure 1:
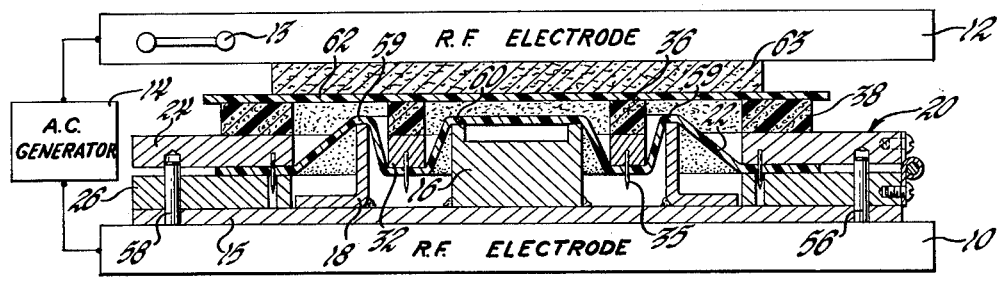
FIGURE 1 is a schematic view of a dielectric press having a sheet of thermoplastic material positioned just prior to the step wherein finite portions of said sheet are removed.

Referring now to FIGURE 1 of the drawings, the dielectric heating press includes a lower stationary metal electrode 10 and an upper metal electrode 12 which is movable toward and away from the lower electrode by any suitable means such as the handle indicated at 13. An alternating current generator 14 is connected in series with the upper and lower press electrodes in order to impress an alternating current of radio frequency therebetween. Suitable switching means may be used to automatically actuate the alternating current generator upon closure of the press. Also in accordance with usual practice the bottom face of upper electrode 12 may be provided with a sheet of silicone rubber or butyl rubber (not shown) in order to prevent arcing between the electrodes when the press is closed and to provide a resilient cushion for the material being embossed thereby assuring that equal pressure is applied to all embossed areas.

Figure 2:
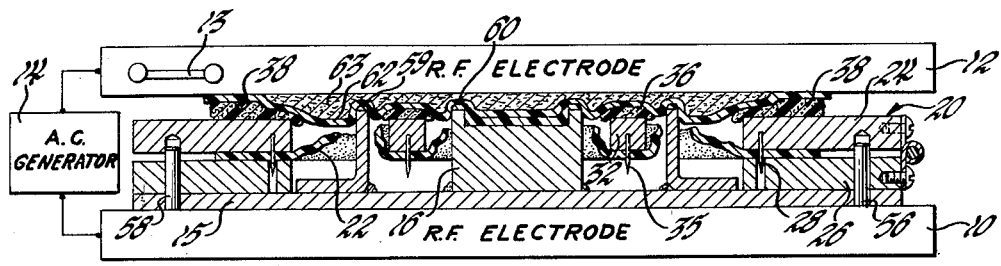
FIGURE 2 is a view similar to FIGURE 1 but showing the press and sheet of thermoplastic material just after the finite portions are removed.

As can best be seen by reference to FIGURE 5, the top surface of the stationary bottom electrode 10 has secured thereto a metal plate 15 with a pair of upwardly extending continuous embossing blades 16 and 18, outer blade 18 surrounding the inner blade 16. The precise shape defined by the upper surfaces of these generally concentrically arranged metal blades is in accordance with the shape of the embossed pattern desired. In the particular embodiment shown, the outer blade 18 is in the form of an elongated trapezoid and the inner blade 16 forms a generally cross-shaped emblem. Positioned on top of the lower electrode is a holder 20 for the thin sheet of thermoplastic material 22. The holder will now be described by reference to FIGURES 3, 4 and 5; however, at this point it should be noted that the height of the blades 16 and 18 and therefore the depth of the opening between the inner and outer blades is relatively large in order to accommodate the holder for the sheet of thermoplastic material when the press is closed as shown in FIGURE 2.

Figure 3:
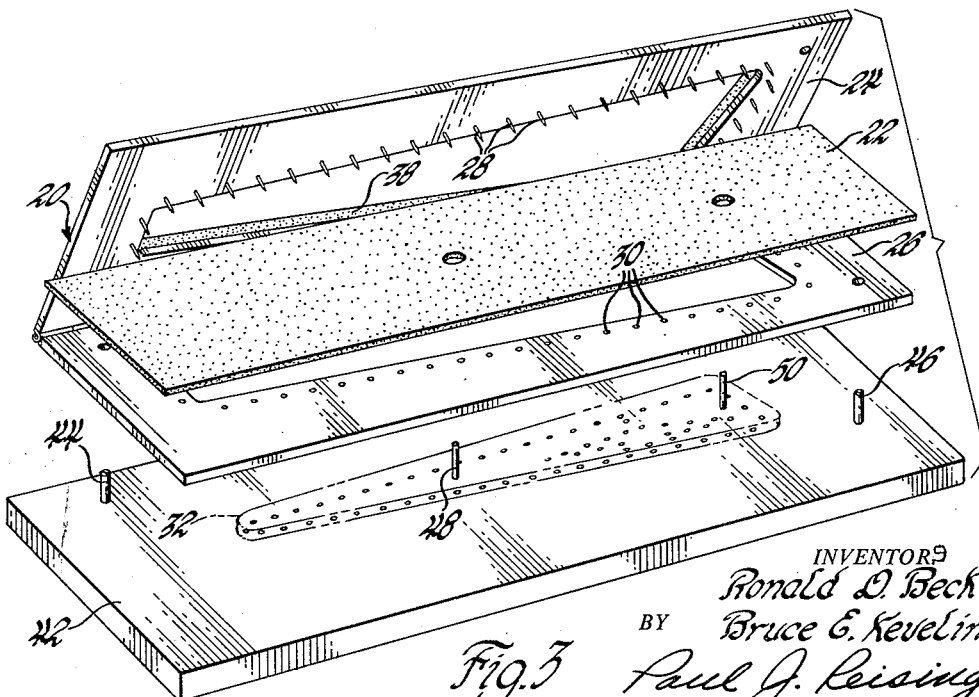
FIGURE 3 is a view of one part of the holder for the sheet of thermoplastic material together with a jig for arranging the holder.

Referring now to FIGURE 3, the holder includes an outer frame having upper and lower members 24 and 26, made of wood or laminated plastic, which are hinged together and which are provided with central openings in alignment with each other when the members 24 and 26 are in closed relationship. The upper member 24 is provided with a plurality of needles 28 around and adjacent the periphery of its opening which are received by corresponding holes 30 around the periphery of the opening in the lower member 26. With reference now to FIGURE 4, the holder for the thermoplastic sheet also includes an inner frame 32, also of wood or laminated plastic, which fits within the opening of the outer frame. This inner frame 32 is formed with a central opening 34 and has a series of downwardly extending needles 35 about its periphery. A facing 36 of resilient foam material, for example polyurethane foam, is bonded to the upper surface of the inner frame, and strips 38 of such resilient foam material are also bonded to the upper surface of the outer frame to form a facing around the peripery of its opening. The holder and thermoplastic sheet are assembled for insertion into the press as follows: First, the outer frame is opened, as shown in FIGURE 3, and the sheet 22 of flexible thermoplastic material, such as plasticized polyvinyl chloride or polyvinylidene chloride, is then laid across the opening in the member 26 and the frame closed such that the needles 28 pierce the thermoplastic material and extend into the corresponding holes 30 in the member 26. Hence, when the outer frame is closed, the sheet 22 is held securely and tautly within the frame. Next, this outer frame assembly is placed on a jig 42 which can be in the form of a wooden table top having upwardly extending pins 44 and 46 positioned to extend through corresponding openings in the outer frame. A second pair of pins 48 and 50 in the jig extend through corresponding openings which can be cut by any suitable means in the sheet of thermoplastic material 22. One convenient manner of accomplishing the openings in the sheet of thermoplastic material is to provide the periphery of the end surface of each of the pins 48 and 50 with a cutting edge such that when the outer frame assembly is placed on the jig each of the pins 48 and 50 will cut its own hole through the sheet with but the application of a slight amount of pressure to the top of the sheet. After the outer frame assembly with associated thermoplastic sheet has been assembled onto the jig, as is shown in FIGURE 4, the inner frame 32 is placed within the opening of the outer frame, the pins 48 and 50 mating with corresponding openings 52 and 54 in the inner frame to thereby position the frames in predetermined position with respect to each other. When the inner frame is placed within the outer frame, the needles 35 are caused to pierce the thermoplastic material and hence the entire holder assembly with associated sheet of thermoplastic material can be removed from the jig, the needles assuring that the predetermined relationship of the inner and outer frames is thereafter maintained. It will be noted that the pins 48 and 50, which are solely for the purpose of attaining correct alignment of the inner and outer frames, must be located such that they do not pierce the portions of the sheet 22 which are to be removed from the sheet by the embossing blades 16 and 18 as hereinafter described.

Referring again now to FIGURE 1, the bottom electrode 10 is provided with a pair of upwardly extending pins 56 and 58 which are in the same position with respect to each other as are the pins 44 and 46 of the assembly jig 42. After assembly of the holder and thermoplastic sheet is completed as above described, it is placed on the lower electrode with the resilient foam 36 and 38 facing upwardly, and in such position that the pins 56 and 58 extend into the corresponding openings in the outer frame of the holder. When so positioned, the arrangement of the embossing blades in such that the inner embossing blade 16 extends into the central opening provided in the inner frame member 32, and the outer embossing blade 18 extends into the space between the inner and outer frames. Hence, the portions 59 and 60 of the relatively flexible thermoplastic 22 which are in abutting relationship with the embossing blades 16 and 18, are caused to be displaced upwardly and out of the original plane of the thermoplastic sheet.

Next, there is laid over the holder assembly the base sheet 62 onto which the embossment is to be made. In the particular embodiment shown the base sheet comprises a flexible thermoplastic material such as polyvinyl chloride backed up by a layer 63 of foam rubber or felt or similar fibrous material preferably impregnated with a resin binder. After the base sheet is positioned over the holder 20 as shown in FIGURE 1, the upper electrode is moved downwardly so as to exert a pressure of about 200 to 800 p.s.i. and the alternating current applied by way of the generator 14. As shown in FIGURE 2, the portions 59 and 60 of the sheet 22 are pressed against the base sheet 62 and the heat generated within these portions causes a clean, smooth-edged separation thereof from the sheet 22, the tension in the remaining portions of the tautly held sheet together with the compression of the resilient facings 36 and 38 against the base sheet causing the remaining portions of the sheet to move back from the portions 59 and 60 and thereby contribute to the smooth non-jagged appearance of the resulting edge portions. Substantially simultaneously with this dielectric cutting of the finite portions 59 and 60 from the sheet 22, such portions are pressed and bonded into the surface of the base sheet 62 by means of the blades 16 and 18. As can be seen by reference to FIGURE 6 which shows the article after removal from the press, the portion 60 takes the form of an emblem having its periphery embossed into and bonded to the backing sheet 62, and portion 59 forms a continuous line surrounding the emblem. The sheet 22 is desirably of a different color than backing sheet 62 and, hence, the finished article will be multi-colored, i.e., a base color with concentric embossed patterns in another color.

The embossing cycle should preferably be in two phases from the time standpoint, the time during which dielectric heating takes place (the heat time) and the time that the 200 to 800 p.s.i. pressure is maintained on the embossed assembly after the heating is accomplished (soak time). A heat time of from 6 to 60 seconds at about 13 megacycles per second, 2500 volts, and a hold time of up to 10 seconds are usually satisfactory. The precise times necessary for optimum results will depend on the exact frequency and voltage used, the materials being embossed, the nature of the pattern, etc. The peak temperature reached during the heat cycle may be from 250° F. to 350° F., a temperature of 325° F. being typical.

If it is desired that the decorative embossments be of different colors, then instead of using a one-piece sheet, as shown at 22, to form the embossments, a composite sheet consisting of a pair or more of generally concentrically arranged portions should be used, one for each of the patterns to be embossed. That is, a sheet portion having a large opening in its center and of one particular color, say green, can be used in place of the sheet 22 shown in the drawings, and then another sheet portion sized to fit within the opening and of a different color, say yellow, can be fitted over the underside of frame member 32 by piercing the needles 35 through it. Then the frame 32 with its associated yellow sheet portion can be assembled to the outer frame with its associated green sheet portion in the manner described above, the needles 35 piercing the green sheet portion during the assembly. When the so-assembled composite sheet is used, as above described, to form embossments in a base sheet which is of still another color, say white, the result is a three-color combination, i.e., a white base, a yellow central embossed pattern and an outer green embossed pattern surrounding the central pattern. Hence it will be understood that the term "sheet" as used herein is intended to comprehend not only a one-piece sheet, as where embossments of the same color are desired, but also a composite sheet comprised of portions of different colors as above described.

Also, while in the embodiment shown there is only a single interior embossment 60 within the perimeter embossment 59, it will be seen that a plurality of interior embossments may be provided, this by utilizing an inner frame with two or more openings rather than only one and by constructing the lower electrode with several inner embossing blades, one to cooperate with each of such openings. If desired, each of the several interior embossments may be of a different color by forming a composite sheet with a different colored portion for each opening in the inner frame. Hence combination of four or more colors can be accomplished in a single embossing operation. Further, while the perimeter embossment 59 shown in the drawings is in the form of a single continuous line it can, if desired, be made to other shapes by appropriate design of the outer embossing blade.

In the embodiment shown and described above, the layer 63 of the base sheet comprises a fibrous material impregnated with a thermoplastic resin such that it sets and holds the depressions made in the base sheet during the embossing operation. If desired, this layer can be eliminated entirely or can be replaced or supplemented with a backing sheet of cloth, cardboard or the like.

The radii of the inner and outer edges of the upper end of each of the embossing blades 16 and 18 control the electrical field around the outer ends of the blades to cause selective heating of the sheet 22 in relatively narrow areas, 59 and 60, and in this connection it is preferable that the radii of these edges of each of the blades 16 and 18 be from .005 to .010 inch. This feature as well as other features which are advantageous in the practice of this invention are fully described in the aforementioned patent application of Ming C. Hsu and Ralph M. Stallard.

While the invention has been described specifically with reference to a particular embodiment thereof, it is understood that changes and modifications may be made, all within the full and intended scope of the claims which follow.

We claim:

1. A method for making a decorative embossed panel comprising positioning a sheet of flexible thermoplastic material adjacent a base sheet, applying pressure to an inner finite portion of the thermoplastic sheet and to a continuous outer finite portion of the thermoplastic sheet surrounding said inner portion to press such portions into engagement with the base sheet, and simultaneously applying tension between said finite portions and other portions of the thermoplastic sheet and applying high frequency electrical energy to said finite portions to thereby heat-soften such portions and allow the tension to cause separation thereof from said other portions while continuing the application of pressure to said finite portions to bond them to the base sheet.

2. A method for making a decorative article comprising positioning a sheet of flexible thermoplastic material adjacent a base sheet between a pair of electrodes, moving one of said electrodes toward the other to apply from about 200 to 800 p.s.i. pressure to spaced generally concentrically arranged finite portions of the thermoplastic sheet and thereby press such portions into engagement with the base sheet, and simultaneously applying tension between said finite portions and the remainder of the thermoplastic sheet and applying high frequency electrical energy to the electrodes to generate a field therebetween, said field being concentrated within the areas of the concentric portions to heat and soften such portions and allow the tension to cause their separation from the remainder of the thermoplastic sheet while continuing the application of pressure to bond said concentric portions to the base sheet.

3. A method for making a decorative article comprising the step of tautly securing a flexible sheet of thermoplastic material in an outer frame, securing an inner frame to said sheet within the opening in said outer frame and in predetermined spaced position with respect to said outer frame, placing a base sheet over said frames and associated sheet of thermoplastic material, applying pressure to a finite portion of the thermoplastic sheet within the opening in the inner frame and to a continuous finite portion of said thermoplastic sheet between said inner and outer frames to displace such portions out of the plane of the flexible sheet into engagement with the base sheet under tension, and applying high frequency electrical energy to said displaced portions to thereby soften the sheet of thermoplastic material in the area of these portions and allow the tension in the sheet to separate said displaced portions therefrom while continuing the application of pressure to said portions to bond them to the base sheet.

4. Apparatus for holding a sheet of flexible thermoplastic material for use in a dielectric embossing process of the type described, said apparatus comprising an outer frame having an opening and a plurality of recesses therein and having upper and lower matched coacting frame members adapted to clamp the sheet of flexible thermoplastic material therebetween, a jig having a set of spaced upstanding pegs positioned to extend into cooperating recesses in said outer frame, an inner frame sized to fit and positioned within the opening in said outer frame having recesses therein and having means thereon for securement in fixed position to said sheet of thermoplastic material, and a second set of spaced upstanding pegs on said jig positioned to extend into cooperating recesses in said inner frame to thereby position the inner frame in a predetermined relationship with respect to the outer frame.

5. Dielectric embossing apparatus for forming a decorative panel having a base sheet with a plurality of embossed patterns therein comprising an electrode adapted to abut the base sheet and an opposed electrode having inner and outer continuous embossing blades extending outwardly from its surface toward the other electrode, said electrodes being connected in series to a source of high frequency electrical energy, inner and outer frames, each having an opening therein, for holding tautly a sheet of flexible thermoplastic material between said electrodes, the inner of said embossing blades extending into the opening in the inner frame and the outer of said electrodes extending between said inner and outer frames, and means for moving said electrodes toward each other whereupon said blades press inner and outer portions of said thermoplastic sheet into contact with said base sheet to heat-soften and bond said portions to said base sheet and to cause said portions to separate from the thermoplastic sheet.

6. Dielectric embossing apparatus as defined in claim 5 wherein the outer frame comprises upper and lower matched frame members adapted to clamp the sheet of flexible heat-fusible material therebetween and wherein each of said frames has a series of needles around and adjacent its opening adapted to extend through the sheet of thermoplastic material to hold said frames in fixed predetermined position with respect to said thermoplastic sheet.

7. Dielectric embossing apparatus as defined in claim 5 wherein said second-mentioned electrode and said outer frame are provided with cooperative means for positioning said frames and said sheet of thermoplastic material in predetermined position with respect to the embossing blades.

8. Dielectric embossing apparatus as defined in claim 5 wherein each of the inner and outer frames is provided with a layer of resilient material on the surface thereof facing the said first mentioned electrode.

9. Dielectric embossing apparatus for forming a decorative panel having a base sheet with a plurality of generally concentrically arranged embossed patterns therein comprising an upper flat electrode adapted to abut the base sheet and an opposed lower electrode having inner and outer generally concentrically arranged continuous embossing blades extending upwardly from its surface toward the upper electrode, said electrodes being connected in series to a source of high frequency electrical energy, inner and outer generally concentrically arranged frames, each having an opening therein, for holding tautly a sheet of flexible thermoplastic material between said electrodes, the inner of said embossing blades extending into the opening in the inner frame and the outer of said electrodes extending between said inner and outer frames, and means for moving said electrodes toward each other whereupon said blades press generally concentric portions of said thermoplastic sheet into contact with said base sheet to heat-soften and bond said portions to said base sheet and to cause said portions to separate from said thermoplastic sheet.

References Cited in the file of this patent

UNITED STATES PATENTS

| | | |
|---|---|---|
| 2,573,466 | Lyijynen | Oct. 30, 1951 |
| 2,747,646 | Lippman | May 29, 1956 |
| 2,749,640 | Scott | June 12, 1956 |
| 2,946,713 | Dusina et al. | July 26, 1960 |
| 2,982,456 | Ming C. Hsu et al. | May 2, 1961 |
| 2,991,216 | Ming C. Hsu et al. | July 4, 1961 |